United States Patent
Lowry et al.

(10) Patent No.: US 10,621,144 B2
(45) Date of Patent: *Apr. 14, 2020

(54) PARALLEL DEDUPLICATION USING AUTOMATIC CHUNK SIZING

(71) Applicant: International Business Machines Corporation, Armonk, NY (US)

(72) Inventors: Debora A. Lowry, Ellensburg, WA (US); Jonathan Mendez, San Jose (CR); Jose D. Ramos, Heredia (CR); Blanca R. Navarro, Heredia (CR)

(73) Assignee: International Business Machines Corporation, Armonk, NY (US)

( * ) Notice: Subject to any disclaimer, the term of this patent is extended or adjusted under 35 U.S.C. 154(b) by 261 days.

This patent is subject to a terminal disclaimer.

(21) Appl. No.: 15/467,336

(22) Filed: Mar. 23, 2017

(65) Prior Publication Data

US 2018/0276237 A1 Sep. 27, 2018

(51) Int. Cl.
*G06F 16/00* (2019.01)
*G06F 16/174* (2019.01)
*G06F 16/2453* (2019.01)

(52) U.S. Cl.
CPC .... *G06F 16/1752* (2019.01); *G06F 16/24532* (2019.01); *G06F 16/24542* (2019.01)

(58) Field of Classification Search
CPC ........... G06F 16/1752; G06F 16/24542; G06F 16/24532
USPC ....................................................... 707/692
See application file for complete search history.

(56) References Cited

U.S. PATENT DOCUMENTS

| | | | |
|---|---|---|---|
| 8,639,669 B1 * | 1/2014 | Douglis | G06F 3/0641 707/692 |
| 8,712,963 B1 | 4/2014 | Douglis et al. | |
| 8,918,375 B2 | 12/2014 | Li et al. | |
| 8,930,306 B1 | 1/2015 | Ngo et al. | |
| 9,213,715 B2 * | 12/2015 | Chambliss | G06F 3/0604 |
| 9,244,623 B1 | 1/2016 | Bent et al. | |
| 9,311,323 B2 | 4/2016 | Chakraborty et al. | |
| 9,690,801 B1 | 6/2017 | Ioannou et al. | |
| 9,892,128 B2 | 2/2018 | Ioannou et al. | |

(Continued)

OTHER PUBLICATIONS

List of IBM Patents or Patent Applications Treated as Related, Appendix P, Filed Herewith, 2 pages.
(Continued)

*Primary Examiner* — Thanh-Ha Dang
(74) *Attorney, Agent, or Firm* — Daniel R. Simek (57) ABSTRACT

An approach for parallel deduplication using automatic chunk sizing. A dynamic chunk deduplicator receives a request to perform data deduplication where the request includes an identification of a dataset. The dynamic chunk deduplicator analyzes file level usage for one or more data files including the dataset to associate a deduplication chunk size with the one or more data files. The dynamic chunk deduplicator creates a collection of data segments from the dataset, based on the deduplication chunk size associated with the one or more data files. The dynamic chunk deduplicator creates a deduplication data chunk size plan where the deduplication data chunk size plan includes deduplication actions for the collection of data segments and outputs the deduplication data chunk size plan.

20 Claims, 4 Drawing Sheets

(56) References Cited

U.S. PATENT DOCUMENTS

| | | | |
|---|---|---|---|
| 10,042,711 B1* | 8/2018 | Chopra | G06F 11/1456 |
| 2012/0158672 A1 | 6/2012 | Oltean et al. | |
| 2012/0166448 A1* | 6/2012 | Li | G06F 16/137 |
| | | | 707/747 |
| 2012/0233417 A1 | 9/2012 | Kalach et al. | |
| 2013/0198459 A1* | 8/2013 | Joshi | G06F 12/084 |
| | | | 711/130 |
| 2014/0095439 A1 | 4/2014 | Ram | |
| 2014/0136779 A1 | 5/2014 | Guha et al. | |
| 2014/0244601 A1* | 8/2014 | Xie | G06F 16/162 |
| | | | 707/692 |
| 2016/0154839 A1 | 6/2016 | Bezawada et al. | |
| 2017/0091232 A1* | 3/2017 | Ghanbari | G06F 16/215 |

OTHER PUBLICATIONS

Lowry, et al., "Parallel Deduplication Using Automatic Chunk Sizing", U.S. Appl. No. 15/856,226, filed Dec. 28, 2017, (a copy is not provided as this application is available to the Examiner).

List of IBM Patents or Patent Applications Treated as Related, Appendix P, Filed Oct. 15, 2019, 2 pages.

U.S. Appl. No. 16/601,889 filed Oct. 15, 2019. IBM Docket No. CA920170015US03 This Reference is not Attached Because it is Readily Available to the Examiner.

* cited by examiner

PARALLEL DEDUPLICATION USING AUTOMATIC CHUNK SIZING

BACKGROUND OF THE INVENTION

The present invention relates generally to computer data compression and more particularly, to data deduplication processing to replace redundant data with space saving referential pointers.

Data deduplication is a data compression technique to eliminate duplicate copies of repeating data. Data deduplication can be used to improve storage utilization and can also be applied to network data transfers to reduce the number of bytes that must be sent in the data transfer. In the deduplication process, unique chunks of data and/or byte patterns, are identified and redundant chunks of data are replaced with a reference pointer to link toward a respective and corresponding unique chunk of data. When data deduplication is used in backups and data transfers, a unique index can be maintained to map link references and store a record of the data chunk size used to perform a deduplication.

SUMMARY

As disclosed herein, a computer-implemented method for parallel deduplication using automatic chunk sizing, the computer-implemented method comprising: receiving, by a dynamic chunk deduplicator, a request to perform data deduplication wherein the request comprises an identification of a dataset; analyzing, by the dynamic chunk deduplicator, file level usage for one or more data files comprising the dataset to associate a deduplication chunk size with the one or more data files; creating, by the dynamic chunk deduplicator, a collection of data segments from the dataset, based on the deduplication chunk size associated with the one or more data files; creating, by the dynamic chunk deduplicator, a deduplication data chunk size plan wherein the deduplication data chunk size plan comprises one or more deduplication actions for the collection of data segments and outputting, by the dynamic chunk deduplicator, the deduplication data chunk size plan. A computer system and a computer program product corresponding to the above method are also disclosed herein.

BRIEF DESCRIPTION OF THE DRAWINGS

The present invention is described in the detailed description, which follows, references the noted plurality of drawings by way of non-limiting examples of exemplary embodiments of the present invention.

DETAILED DESCRIPTION

Embodiments of the present invention provide an approach to improve data deduplication compression density by selecting data chunk size (e.g., a segment of data) automatically/dynamically based on usage at a file level to balance benefits of storage capacity needs versus information retrieval performance. It should be noted that in a conventional computing environment, data chunk size used for deduplication, can frequently be predetermined as a system setup option. A larger data chunk can result in a fast deduplication and information retrieval (e.g., information retrieval performance) but data duplicates can be less likely to be found versus a smaller data chunk where smaller data segments can more likely identify duplicates of data segments and reduce data storage needs. In general, it can be said that smaller data chunks can result on a smaller storage requirement however more links are produced and time consumed to access data via links can affect data access time (e.g., information retrieval performance) versus storage space usage.

Embodiments of the present invention analyze access frequency of files comprising a received dataset to determine usage thresholds (e.g., hot degree) of the file. As used herein, a hot degree is a metric indicating file access and modification frequency to indicate how active/inactive a data file is. A hot degree can be measured by the usage frequency/count of a data file within a predetermined time frame. For simplicity of description, temperature terms such as, but not limited to, hot, warm, cool and cold, can be used to describe different threshold levels of a hot degree. A range of usage threshold levels (e.g., hot degrees) can be used to select a range of deduplication chunk sizes (e.g., data segment size) associated with the range of hot degrees to dynamically/automatically select a deduplication chunk size that is based on file level usage to optimize access performance versus storage capacity needs during deduplication.

Some embodiments can create/mark data segments representing data files in a dataset and group the data segments by deduplication chunk size. An analysis such as, but not limited to, comparing hash values of data segments in each data grouping comprising the collection of data segments can be performed to determine duplicate data segments within a deduplication chunk size grouping. A deduplication data chunk size plan can be created that comprises one or more deduplication actions identifying unique data segments (e.g., data segments having no duplicates) for the collection of data segments. The deduplication data chunk size plan can be output for an Administrator to respond with plan decision(s) to accept/reject the deduplication actions. It should be noted that approval of the plan can be selective from the entirety of the deduplication data chunk size plan and/or a subset of one or more deduplication actions based on individual selections such as, but not limited to, selection of one or more data segments comprising a deduplication chunk size. If the deduplication actions are accepted by the Administrator, then a plurality of jobs (e.g., collection of parallel deduplication jobs) can be created to process/run in parallel where each deduplication job can be based on a group of data comprising a deduplication chunk size. Alternatively, if the deduplication actions are rejected by the Administrator, then one or more deduplication jobs can be created to process/run the one or more deduplication jobs using a predetermined chunk size.

Embodiments of the present invention will now be described in detail with reference to the figures. It should be noted that references in the specification to "an exemplary embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure or characteristic is described in connection with an embodiment, it is submitted that it is within the knowledge of one skilled in the art to affect such feature, structure or characteristic in connection with other embodiments whether or not explicitly described.

Figure 1:
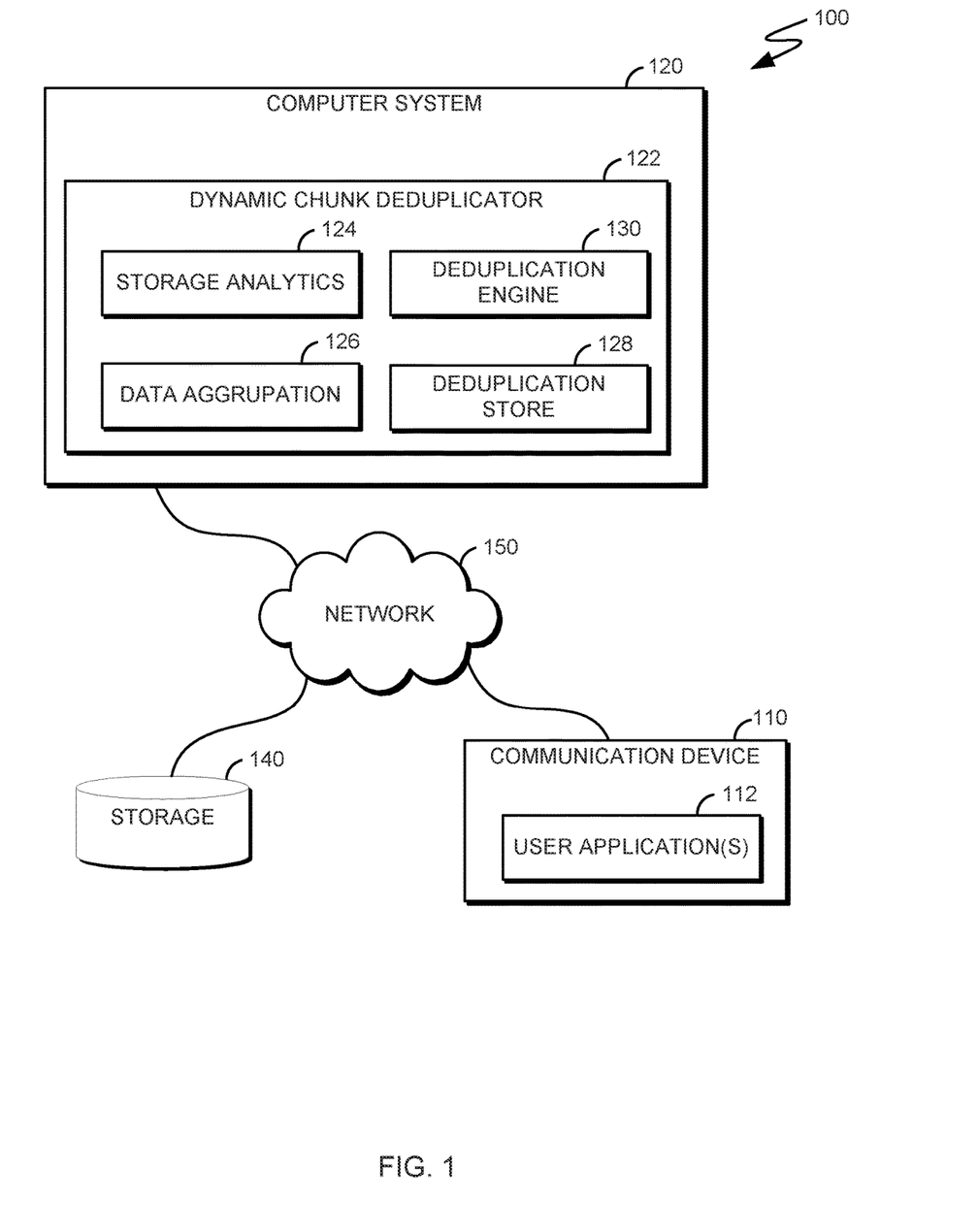
FIG. 1 illustrates a functional block diagram of a computing environment, in accordance with an embodiment of the present invention.

FIG. 1 illustrates a functional block diagram of computing environment 100, in accordance with an embodiment of the present invention. Computing environment 100 comprises COMMUNICATION DEVICE 110, STORAGE 140 and COMPUTER SYSTEM 120, interconnected via NETWORK 150. COMMUNICATION DEVICE 110, STORAGE 140 and COMPUTER SYSTEM 120 can be desktop computers, laptop computers, specialized computer servers, or the like. In certain embodiments, COMMUNICATION DEVICE 110, STORAGE 140 and COMPUTER SYSTEM 120 collectively represent computer systems utilizing clustered computers and components acting as a single pool of seamless resources via NETWORK 150. For example, such embodiments can be used in data center, cloud computing, storage area network (SAN), and network attached storage (NAS) applications. In general, COMMUNICATION DEVICE 110, STORAGE 140 and COMPUTER SYSTEM 120 are representative of any electronic devices, or combination of electronic devices, capable of executing computer readable program instructions, as described in detail with regard to FIG. 4.

In some embodiments, COMMUNICATION DEVICE 110 can be a plurality of COMMUNICATION DEVICES 110 and COMMUNICATION DEVICE 110 can be a separate and/or integrated tool that can operate with STORAGE 140 and COMPUTER SYSTEM 120 to perform functions related with dynamic chunk deduplication. COMMUNICATION DEVICE 110 comprises USER APPLICATION(S) 112.

In some embodiments, USER APPLICATION(S) 112 can be a plurality of USER APPLICATION(S) 112 within COMMUNICATION DEVICE 110. USER APPLICATION(S) 112 can operate with a dynamic chunk deduplicator and other related deduplication tools such as, but not limited to, backup software and replication software. In some embodiments, USER APPLICATION(S) 112 can operate with any combination of commercial or custom devices and/or software products associated with dynamic chunk deduplication.

In some embodiments, STORAGE 140 can be a plurality of STORAGES 140. STORAGE 140 can access and manage data operations related to dataset management and data deduplication. In some embodiments, STORAGE 140 can comprise any combination of commercial or custom devices and/or software products associated with accessing and managing datasets that can be deduplicated by dynamic chunk deduplication.

NETWORK 150 can be, for example, a local area network (LAN), a wide area network (WAN) such as the Internet, or a combination of the two, and include wired, wireless, or fiber optic connections. In general, NETWORK 150 can be any combination of connections and protocols that can support communications between COMMUNICATION DEVICE 110, STORAGE 140 and COMPUTER SYSTEM 120, in accordance with some embodiments.

In some embodiments, COMPUTER SYSTEM 120 can be a plurality of COMPUTER SYSTEMS 120 and COMPUTER SYSTEM 120 can be a separate and/or integrated tool that can be operated with a dynamic chunk deduplicator. In the depicted embodiment, COMPUTER SYSTEM 120 comprises, DYNAMIC CHUNK DEDUPLICATOR 122.

In some embodiments, DYNAMIC CHUNK DEDUPLICATOR 122 can operate in conjunction with a combination of commercial or custom devices and/or software products associated with dataset deduplication. DYNAMIC CHUNK DEDUPLICATOR 122 can be a plurality of DYNAMIC CHUNK DEDUPLICATORS 122 within COMPUTER SYSTEM 120. In the depicted embodiment, DYNAMIC CHUNK DEDUPLICATOR 122 comprises, STORAGE ANALYTICS 124, DATA AGGRUPATION 126, DEDUPLICATION STORE 128 and DEDUPLICATION ENGINE 130.

In some embodiments, STORAGE ANALYTICS 124 can be a plurality of STORAGE ANALYTICS 124 within DYNAMIC CHUNK DEDUPLICATOR 122. STORAGE ANALYTICS 124 can analyze a received deduplication request for a dataset to determine a range of file level usage metrics to categorize access levels (e.g., hot, cold) of files comprising the dataset. STORAGE ANALYTICS 124 can operate with access metrics and trends such as, but not limited to, last access, file timestamp(s), data change frequency, data access frequency and usage statistics to determine a data file hot degree. The data file hot degree measure can be used by STORAGE ANALYTICS 124 to identify usage thresholds and related deduplication chunk sizes (e.g., fragment size) to determine a data segment size that can be used during deduplication of data segments having a similar deduplication chunk size. The usage thresholds measure can operate with a range of hot degree threshold levels to dynamically determine deduplication chunk size to balance storage capacity needs versus information retrieval performance. When STORAGE ANALYTICS 124 completes analysis, the results can be sent toward DATA AGGRUPATION 126.

In some embodiments, DATA AGGRUPATION 126 can be a plurality of DATA AGGRUPATIONS 126 within DYNAMIC CHUNK DEDUPLICATOR 122. It should be noted that that aggrupation can be defined as a formation of a group or organization. DATA AGGRUPATION 126 can create and organize groups of data segments comprising data files received from the dataset processed by STORAGE ANALYTICS 124. DATA AGGRUPATION 126 can create groupings of data segments by deduplication chunk size. The data segments comprising each group, can be analyzed by techniques such as, but not limited to, comparison of hash values of data segments to determine duplicate data segments (e.g., determine unique data segments) within the group to create one or more deduplication actions for the collection of data segments. It should be noted that the deduplication actions can identify information such as, but not limited to, a deduplication data chunk size, a quantity of data segments that are duplicate, a deduplication ratio, a compression ratio. In some embodiments, DATA AGGRUPATION 126 can further analyze deduplicated data in DEDUPLICATION STORE 128 to identify matches of a current data segments with a history of deduplication objects to identify additional deduplication density. When DATA AGGRUPATION 126 completes processing, the deduplication chunk size groupings can be sent toward DEDUPLICATION ENGINE 130.

In some embodiments, DEDUPLICATION STORE 128 can be a plurality of DEDUPLICATION STORES 128 within DYNAMIC CHUNK DEDUPLICATOR 122 and/or accessible by DYNAMIC CHUNK DEDUPLICATOR 122 to perform operations such as, but not limited to, read, write, modify and delete DEDUPLICATION STORE 128 information. DEDUPLICATION STORE 128 can be described as a deduplication database that stores deduplication information such as, but not limited to, an index of deduplicated data segments, deduplication chunk size and deduplication linkage pointer which can link deduplicated data segments with storage location(s) comprising associated data segment content, respectively. DEDUPLICATION STORE 128 can be characterized as point of control as data file(s) is/are accessed, data file(s) retrieval can reference DEDUPLICATION STORE 128 to traverse deduplicated links to output data file(s) of interest.

In some embodiments, DEDUPLICATION ENGINE 130 can be a plurality of DEDUPLICATION ENGINES 130 within DYNAMIC CHUNK DEDUPLICATOR 122. DEDUPLICATION ENGINE 130 can create a deduplication data chunk size plan based on one or more deduplication actions (via DATA AGGRUPATION 126). DEDUPLICATION ENGINE 130 can output the deduplication data chunk size plan and receive a plan decision of accept/reject in response to one or more deduplication actions comprising the deduplication data chunk size plan. Based on an Administrator acceptance of one or more deduplication actions from the deduplication data chunk size plan, DEDUPLICATION ENGINE 130 can create a collection of parallel deduplication jobs that can be processed in parallel based on deduplication chunk size. When an Administrator responds with a plan decision of reject for one or more deduplication actions, DEDUPLICATION ENGINE 130 can create one or more deduplication jobs based on predetermined/default chunk size to override one or more deduplication actions identified in the deduplication data chunk size plan. Further, DEDUPLICATION ENGINE 130 can update DEDUPLICATION STORE 128 to create/modify deduplication information such as, but not limited to, an index of deduplicated data segments, deduplication chunk sizes and deduplication linkage pointers based on at least the collection of parallel deduplication jobs or the one or more deduplication jobs. It should be noted that in some embodiments, DEDUPLICATION ENGINE 130 can execute the collection of parallel deduplication jobs and/or the one or more deduplication jobs and in other embodiments DEDUPLICATION ENGINE 130 can send the collection of parallel deduplication jobs and/or the one or more deduplication jobs toward a supporting execution module/function. It should be further noted that updates toward DEDUPLICATION STORE 128 can be concurrent, precede or follow completion of the collection of parallel deduplication jobs and/or the one or more deduplication jobs, depending on implementation requirements.

Figure 2A:
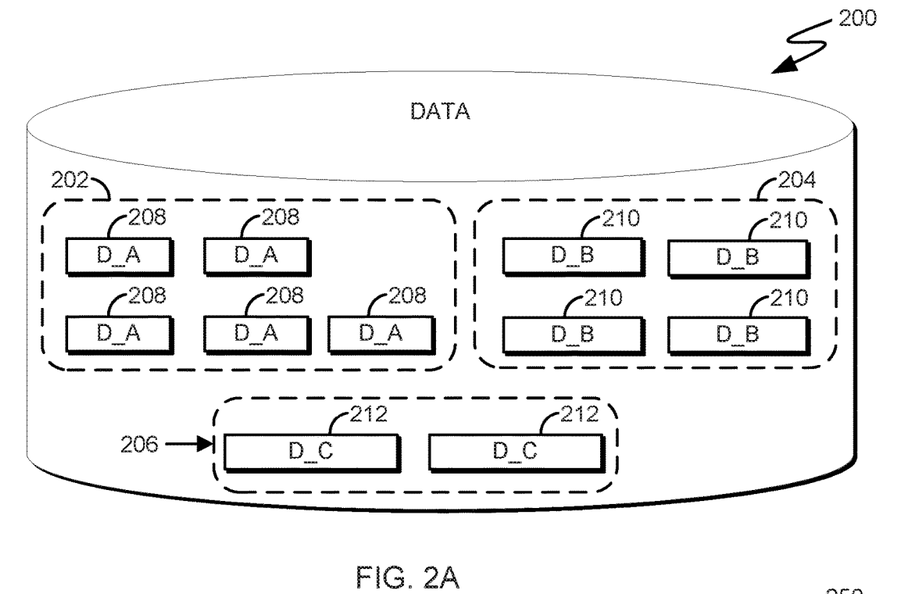
FIG. 2A illustrates storage analytics performed on a deduplication request received by a dynamic chunk deduplicator, in accordance with an embodiment of the present invention.

FIG. 2A illustrates storage analytics performed on a deduplication request received by a dynamic chunk deduplicator, in accordance with an embodiment of the present invention. The dynamic chunk deduplicator analysis illustration 200 represents data in a dataset being analyzed by DYNAMIC CHUNK DEDUPLICATOR 122 for data deduplication and comprises items DATA GROUP_A 202, DATA GROUP_B 204, DATA GROUP_C 206, D_A 208, D_B 210 and D_C 212.

Item DATA GROUP_A 202 illustrates 'data grouping A' as determined by STORAGE ANALYTICS 124 and DATA AGGRUPATION 126. Similarly, item DATA GROUP_B 204 illustrates 'data grouping B' and item DATA GROUP_C 206 illustrates 'data grouping C'. Items DATA GROUP_A 202, DATA GROUP_B 204 and DATA GROUP_C 206 can be based on groupings of deduplication chunk size as segmented by access thresholds/hot degrees ranging from cold, warm and hot. In FIG. 2A illustration, item DATA GROUP_A 202 comprises item D_A 208 having a cold access threshold and is assigned a smaller data segment size as compared to DATA GROUP_B 204, comprising item D_B 210 with a larger data segment size due to a warm access threshold but with a smaller data segment size than item DATA GROUP_C 206, comprising item D_C 212 and having a hot access threshold. It should be noted that the limited quantity of data segments per each grouping (e.g., items DATA GROUP_A 202, DATA GROUP_B 204, DATA GROUP_C 206) is depicted for illustrative purposes and actual quantities of unique data segments per deduplication chunk size can comprise a plurality of unique data segments and the plurality of unique data segments can depend on the size of the dataset processed as well as the deduplication chunk size used for hash value comparison.

Figure 2B:
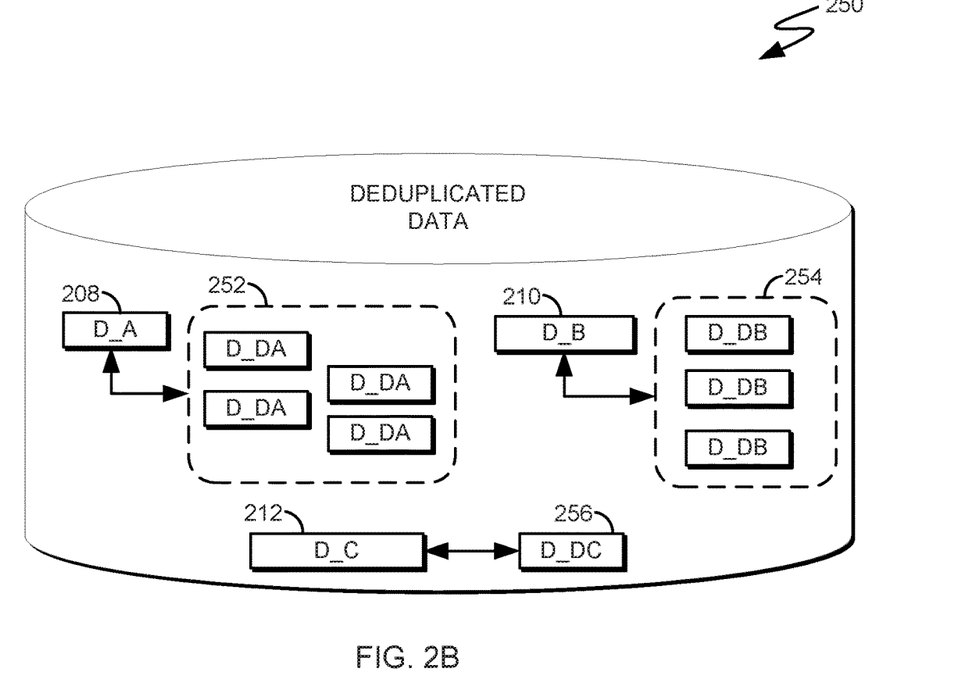
FIG. 2B illustrates resultant deduplication determined by a dynamic chunk deduplicator, in accordance with an embodiment of the present invention.

FIG. 2B illustrates resultant deduplication determined by a dynamic chunk deduplicator, in accordance with an embodiment of the present invention. The dynamic chunk deduplicator, determined deduplication illustration 250 represents data groupings and deduplication actions as determined by DATA AGGRUPATION 126 and comprises items D_A 208, D_B 210, D_C 212, DEDUPE GROUP_A 252, DEDUPE GROUP_B 254 and DEDUPE GROUP_C 256.

Items D_A 208, D_B 210 and D_C 212 represent respective items DATA GROUP_A 202, DATA GROUP_B 204 and DATA GROUP_C 206 as reduced to a single data segment after deduplication (e.g., DATA AGGRUPATION 126). It should be noted that while one unique data segment is illustrated per each data group (e.g., item D_A 208), the quantity of reduced/unique data segments per deduplication chunk size grouping can comprise a plurality data segments as data segments are determined to be unique.

Item DEDUPE GROUP_A 252 illustrates a deduplicated data grouping A (e.g., item DATA GROUP_A 202). As illustrated, item D_A 208 has been reduced to a single copy of "D_A" and item DEDUPE GROUP_A 252 comprise deduplication pointers, to replace other respective instances of data "D_DA" that were formerly described in item DATA GROUP_A 202. DATA AGGRUPATION 126 can link item DEDUPE GROUP_A 252 with pointers toward item D_A 208, illustrated with a linking arrow.

Similarly, items DEDUPE GROUP_B 254, DEDUPE GROUP_C 256 and corresponding linked items D_C 212, DATA_GROUP_A 202 represent a respective deduplication of items DATA GROUP_B 204, DATA GROUP_C 206. It should be noted that FIG. 2B can represent the condition of data after deduplication on a storage device (e.g., STORAGE 140) as recommended by DEDUPLICATION ENGINE 130 and as accepted by an Administrator.

Figure 3:
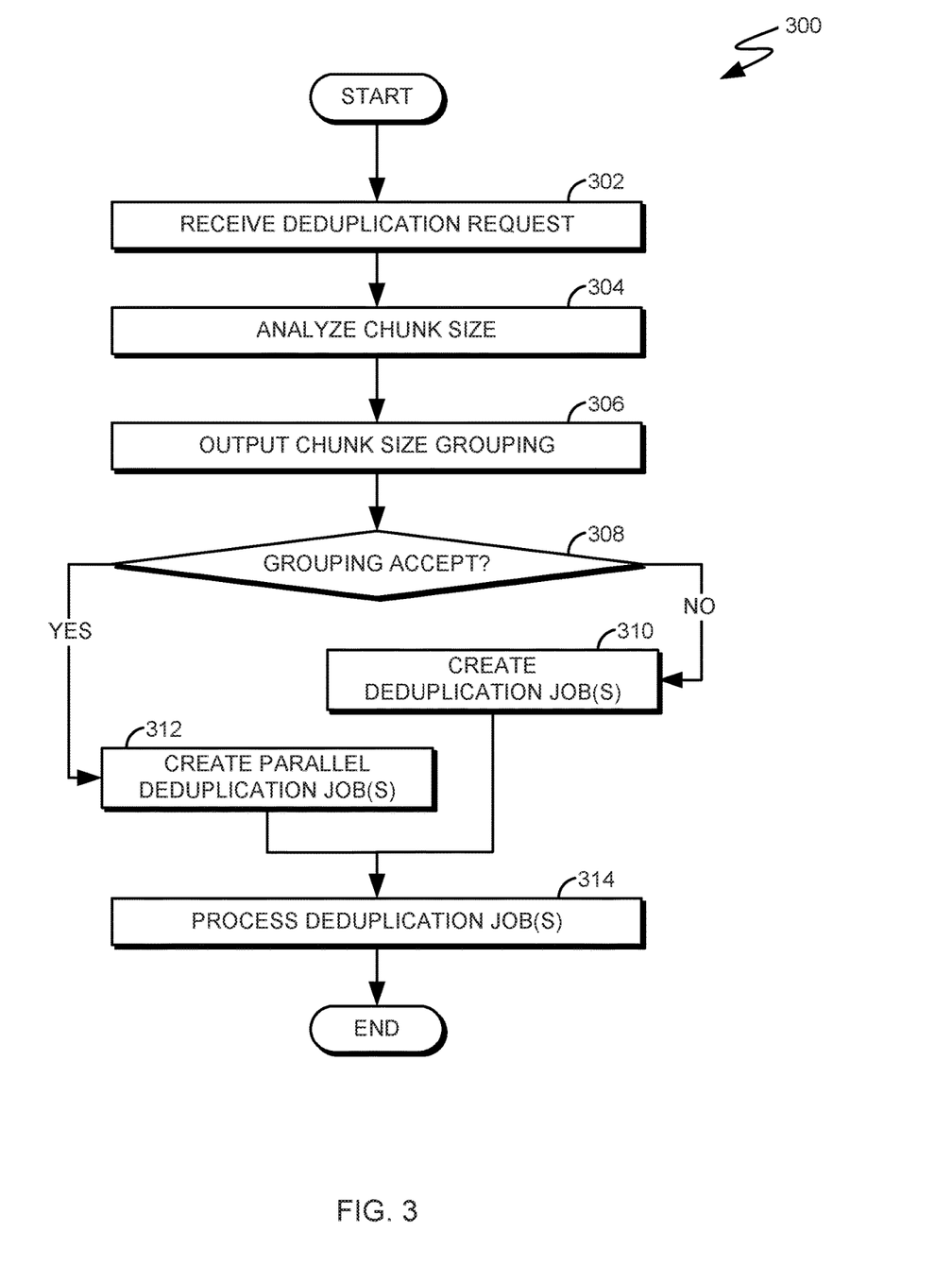
FIG. 3 illustrates a flowchart of dynamic chunk size deduplication processing, in accordance with an embodiment of the present invention.

FIG. 3 illustrates a flowchart of dynamic chunk size deduplication processing, in accordance with an embodiment of the present invention. Dynamic chunk size deduplication processing 300, comprises operations RECEIVE DEDUPLICATION REQUEST 302, ANALYZE CHUNK SIZE 304, OUTPUT CHUNK SIZE GROUPING 306, GROUPING ACCEPT 308, CREATE DEDUPLICATION JOB(S) 310, CREATE PARALLEL DEDUPLICATION JOB(S) 312 and PROCESS DEDUPLICATION JOB(S) 314.

Operation RECEIVE DEDUPLICATION REQUEST 302, can receive a request to perform dynamic chunk deduplication (e.g., DYNAMIC CHUNK DEDUPLICATOR 122) on a dataset. When operation RECEIVE DEDU- PLICATION REQUEST 302 completes, processing proceeds toward operation ANALYZE CHUNK SIZE 304.

Operation ANALYZE CHUNK SIZE 304, can determine hot/cold status of one or more data files comprising the dataset. STORAGE ANALYTICS 124 can analyze one or more data files comprising the dataset and based on a file level usage analysis, one or more hot degree/usage thresholds can be used to determine a deduplication chunk size. DATA AGGRUPATION 126 can determine hash values of data segments can compare hash values within each grouping to identify unique data segments and/or duplicate data segments and create one or more deduplication actions. When operation ANALYZE CHUNK SIZE 304 completes, processing proceeds toward operation OUTPUT CHUNK SIZE GROUPING 306.

Operation OUTPUT CHUNK SIZE GROUPING 306, can create a deduplication data chunk size plan (e.g., DEDUPLICATION ENGINE 130) based on the one or more deduplication actions and DEDUPLICATION ENGINE 130 can output the deduplication data chunk size plan for Administrator interaction/response. It should be noted that the Administrator interaction/response provides an ability to modify and/or optimize deduplication execution of the deduplication data chunk size plan. It should be further noted that some embodiments can implement and automatic Administrator interaction/response based on predetermined rules. Still further, it should be noted that the deduplication data chunk size plan can be output in a format such as, but not limited to, interaction display, hot-link enabled report, log file and static report/file. When operation OUTPUT CHUNK SIZE GROUPING 306 completes, processing proceeds toward operation GROUPING ACCEPT 308.

Operation GROUPING ACCEPT 308, can receive a plan decision as a response from an Administrator to accept/reject one or more deduplication actions from the deduplication data chunk size plan. If a plan decision is received by DEDUPLICATION ENGINE 130 as reject (e.g., "NO"), then processing proceeds toward operation CREATE DEDUPLICATION JOB(S) 310 otherwise (e.g., plan decision is "YES") processing proceeds toward operation CREATE PARALLEL DEDUPLICATION JOB(S) 312.

Operation CREATE DEDUPLICATION JOB(S) 310, can create one or more deduplication jobs based on a predetermined chunk size and bypass the deduplication data chunk size plan of DYNAMIC CHUNK DEDUPLICATOR 122. When operation CREATE DEDUPLICATION JOB(S) 310 completes, processing proceeds toward operation PROCESS DEDUPLICATION JOB(S) 314.

Operation CREATE PARALLEL DEDUPLICATION JOB(S) 312, can create a collection of parallel deduplication jobs based on the plan decision of accept for the data segments identified by the one or more deduplication actions identified in the deduplication data chunk size plan. When operation CREATE PARALLEL DEDUPLICATION JOB(S) 312 completes, processing proceeds toward operation PROCESS DEDUPLICATION JOB(S) 314. It should be noted that each grouping of data segments within a deduplication chunk size can comprise one or more jobs and each job can be processed in parallel due to an inherent data independence between deduplication chunk size unique data segments.

Operation PROCESS DEDUPLICATION JOB(S) 314, can execute or output the collection of parallel deduplication jobs and/or the one or more deduplication jobs toward a supporting function. Operation PROCESS DEDUPLICATION JOB(S) 314 can store deduplication information such as, but not limited to, an index of deduplicated data segments, deduplication chunk size and deduplication linkage pointer used during a deduplication operation toward DEDUPLICATION STORE 128. When operation PROCESS DEDUPLICATION JOB(S) 314 completes, processing proceeds toward END.

Figure 4:
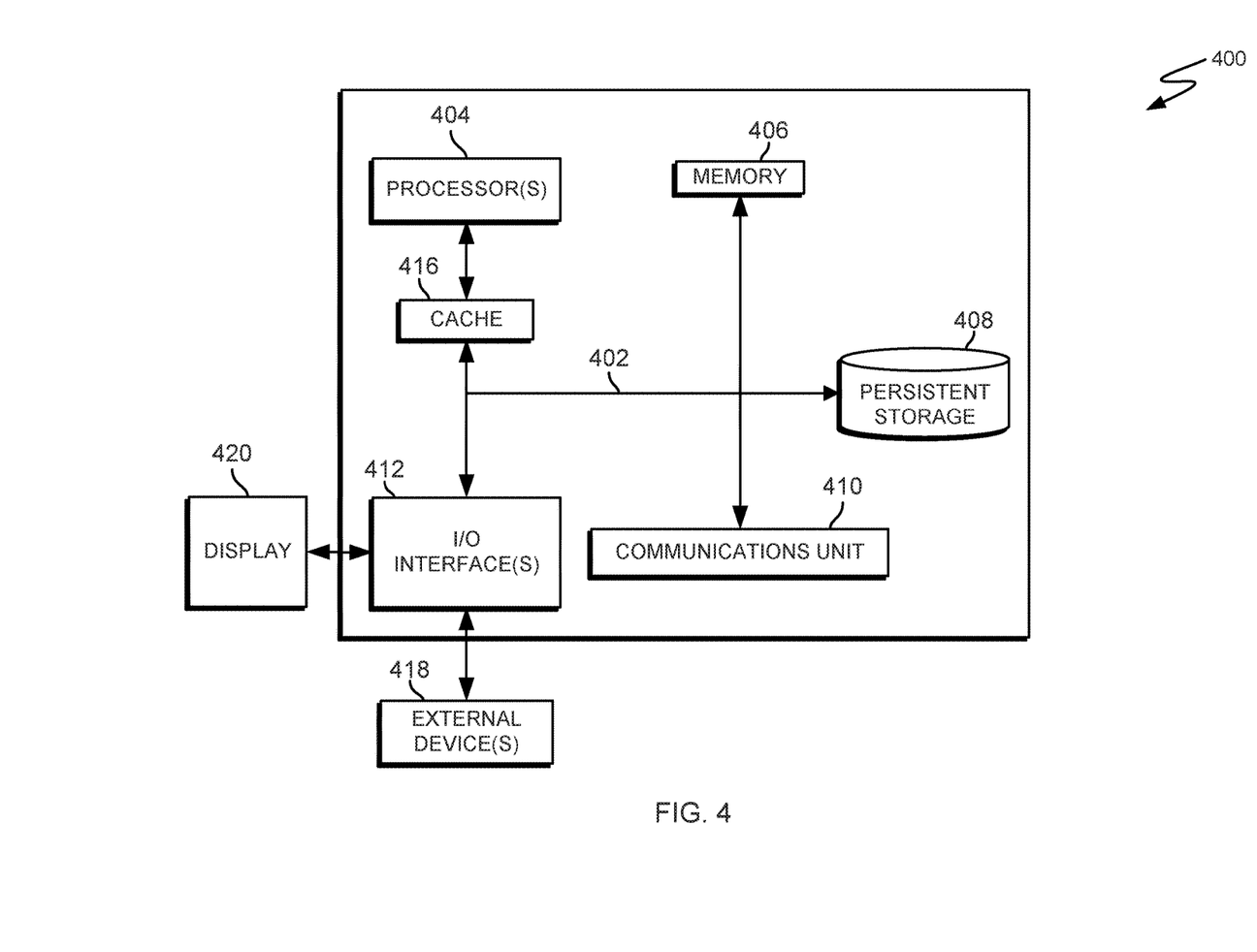
FIG. 4 illustrates a block diagram of components of the server and/or the computing device, in accordance with an embodiment of the present invention.

FIG. 4 illustrates a block diagram of components of COMMUNICATION DEVICE 110 and COMPUTER SYSTEM 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer system 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Computer system 400 includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice some embodiments may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice some embodiments may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice some embodiments can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The term "present invention" should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

The term "and/or" should be understood as inclusive or; for example, A, B "and/or" C means that at least one of A, B or C is true and applicable. Further, "at least one of A, B, or C" should be interpreted to mean only A, only B, only C, or any combination of A, B, and C.

What is claimed is:

1. A computer-implemented method for parallel deduplication using automatic chunk sizing, the computer-implemented method comprising:

receiving, by a dynamic chunk deduplicator, a request to perform data deduplication wherein the request comprises an identification of a dataset;

analyzing, by the dynamic chunk deduplicator, file level usage for one or more data files comprising the dataset to associate a deduplication chunk size with the one or more data files;

creating, by the dynamic chunk deduplicator, a collection of data segments from the dataset, based on the deduplication chunk size associated with the one or more data files;

creating, by the dynamic chunk deduplicator, a deduplication data chunk size plan wherein the deduplication data chunk size plan comprises one or more deduplication actions for the collection of data segments; and outputting, by the dynamic chunk deduplicator, the deduplication data chunk size plan.

2. The computer-implemented method of claim 1, further comprising:

receiving, by the dynamic chunk deduplicator, a plan decision of at least one of an accept or reject of the one or more deduplication actions;

responsive to receiving the plan decision is accept, creating, by the dynamic chunk deduplicator, a collection of parallel deduplication jobs; and responsive to receiving the plan decision is reject, creating, by the dynamic chunk deduplicator, a deduplication job wherein the one or more deduplication jobs is based on a predetermined chunk size.

3. The computer-implemented method of claim 2, further comprising:

creating, by the dynamic chunk deduplicator, deduplication information wherein the deduplication information comprises at least an index of deduplicated data segments, deduplication chunk size and deduplication linkage pointer and the deduplication information is based on at least the collection of parallel deduplication jobs or the one or more deduplication jobs; and storing, by the dynamic chunk deduplicator, the deduplication information.

4. The computer-implemented method of claim 1, wherein the file level usage is based on analyzing access of the one or more data files wherein a range of usage thresholds are used to identify one of the deduplication chunk size to associate with the one or more data files.

5. The computer-implemented method of claim 1, wherein the one or more deduplication actions is determined by identifying unique data segments based on hash value comparison of the collection of data segments.

6. The computer-implemented method of claim 2, wherein one or more jobs associated with the collection of parallel deduplication jobs is based on one of the deduplication chunk size to group a respective set of the collection of data segments matching the deduplication chunk size.

7. The computer-implemented method of claim 4, wherein a usage threshold is a measure of access frequency of the one or more data files within a predetermined time frame.

8. A computer-implemented computer program product for parallel deduplication using automatic chunk sizing, the computer program product comprising:

one or more non-transitory computer readable storage media and program instructions stored on the one or more non-transitory computer readable storage media, the program instructions comprising:

program instructions to, receive, by a dynamic chunk deduplicator, a request to perform data deduplication wherein the request comprises an identification of a dataset;

program instructions to, analyze, by the dynamic chunk deduplicator, file level usage for one or more data files comprising the dataset to associate a deduplication chunk size with the one or more data files;

program instructions to, create, by the dynamic chunk deduplicator, a collection of data segments from the dataset, based on the deduplication chunk size associated with the one or more data files;

program instructions to, create, by the dynamic chunk deduplicator, a deduplication data chunk size plan wherein the deduplication data chunk size plan comprises one or more deduplication actions for the collection of data segments; and program instructions to, output, by the dynamic chunk deduplicator, the deduplication data chunk size plan.

9. The computer-implemented computer program product of claim 8, further comprising:

program instructions to, receive, by the dynamic chunk deduplicator, a plan decision of at least one of an accept or reject of the one or more deduplication actions;

program instructions to, respond to receive the plan decision is accept, creating, by the dynamic chunk deduplicator, a collection of parallel deduplication jobs; and program instructions to, respond to receive the plan decision is reject, creating, by the dynamic chunk deduplicator, one or more deduplication jobs wherein the one or more deduplication jobs is based on a predetermined chunk size.

10. The computer-implemented computer program product of claim 9, further comprising:

program instructions to, create, by the dynamic chunk deduplicator, deduplication information wherein the deduplication information comprises at least an index of deduplicated data segments, deduplication chunk size and deduplication linkage pointer and the deduplication information is based on at least the collection of parallel deduplication jobs or the one or more deduplication jobs; and program instructions to, store, by the dynamic chunk deduplicator, the deduplication information.

11. The computer-implemented computer program product of claim 8, wherein the file level usage is based on analyzing access of the one or more data files wherein a range of usage thresholds are used to identify one of the deduplication chunk size to associate with the one or more data files.

12. The computer-implemented computer program product of claim 8, wherein the one or more deduplication actions is determined by identifying unique data segments based on hash value comparison of the collection of data segments.

13. The computer-implemented computer program product of claim 9, wherein one or more jobs associated with the collection of parallel deduplication jobs is based on one of the deduplication chunk size to group a respective set of the collection of data segments matching the deduplication chunk size.

14. The computer-implemented computer program product of claim 11, wherein a usage threshold is a measure of access frequency of the one or more data files within a predetermined time frame.

15. A computer system for parallel deduplication using automatic chunk sizing, the computer system comprising:

one or more computer processors;

one or more non-transitory computer readable storage media;

program instructions stored on the one or more computer non-transitory readable storage media for execution by at least one of the one or more computer processors, the program instructions comprising:

program instructions to, receive, by a dynamic chunk deduplicator, a request to perform data deduplication wherein the request comprises an identification of a dataset;

program instructions to, analyze, by the dynamic chunk deduplicator, file level usage for one or more data files comprising the dataset to associate a deduplication chunk size with the one or more data files;

program instructions to, create, by the dynamic chunk deduplicator, a collection of data segments from the dataset, based on the deduplication chunk size associated with the one or more data files;

program instructions to, create, by the dynamic chunk deduplicator, a deduplication data chunk size plan wherein the deduplication data chunk size plan comprises one or more deduplication actions for the collection of data segments; and program instructions to, output, by the dynamic chunk deduplicator, the deduplication data chunk size plan.

16. The computer system of claim 15, further comprising:

program instructions to, receive, by the dynamic chunk deduplicator, a plan decision of at least one of an accept or reject of the one or more deduplication actions;

program instructions to, respond to receive the plan decision is accept, creating, by the dynamic chunk deduplicator, a collection of parallel deduplication jobs; and program instructions to, respond to receive the plan decision is reject, creating, by the dynamic chunk deduplicator, one or more deduplication jobs wherein the one or more deduplication jobs is based on a predetermined chunk size.

17. The computer system of claim 16, further comprising:

program instructions to, create, by the dynamic chunk deduplicator, deduplication information wherein the deduplication information comprises at least an index of deduplicated data segments, deduplication chunk size and deduplication linkage pointer and the deduplication information is based on at least the collection of parallel deduplication jobs or the one or more deduplication jobs; and program instructions to, store, by the dynamic chunk deduplicator, the deduplication information.

18. The computer system of claim 15, wherein the file level usage is based on analyzing access of the one or more data files wherein a range of usage thresholds are used to identify one of the deduplication chunk size to associate with the one or more data files.

19. The computer system of claim 15, wherein the one or more deduplication actions is determined by identifying unique data segments based on hash value comparison of the collection of data segments.

20. The computer system of claim 16, wherein one or more jobs associated with the collection of parallel deduplication jobs is based on one of the deduplication chunk size to group a respective set of the collection of data segments matching the deduplication chunk size.

* * * * *

UNITED STATES PATENT AND TRADEMARK OFFICE
CERTIFICATE OF CORRECTION

PATENT NO.       : 10,621,144 B2
APPLICATION NO.  : 15/467336
DATED            : April 14, 2020
INVENTOR(S)      : Lowry et al.

It is certified that error appears in the above-identified patent and that said Letters Patent is hereby corrected as shown below:

On the Title Page

Item (72) Name of Inventor #2 should read: Jonathan Mendez Chacon (not Jonathan Mendez).

Item (72) Name of Inventor #3 should read: Jose Daniel Ramos Chaves (not Jose D. Ramos).

Item (72) Name of Inventor #4 should read: Blanca R. Navarro Piedra (not Blanca R. Navarro).

Signed and Sealed this
Twenty-fourth Day of November, 2020

Andrei Iancu
*Director of the United States Patent and Trademark Office*